Dec. 31, 1968  R. L. HAGEDORN  3,419,476
PROCESS FOR RECOVERING LIQUID CARBOXYLIC ACID AMINE SOLVENT
FROM AQUEOUS SOLUTION THEREOF CONTAINING ACETYLENIC
POLYMERS BY FLASH DISTILLATION
WITH A HYDROCARBON OIL
Filed April 11, 1967
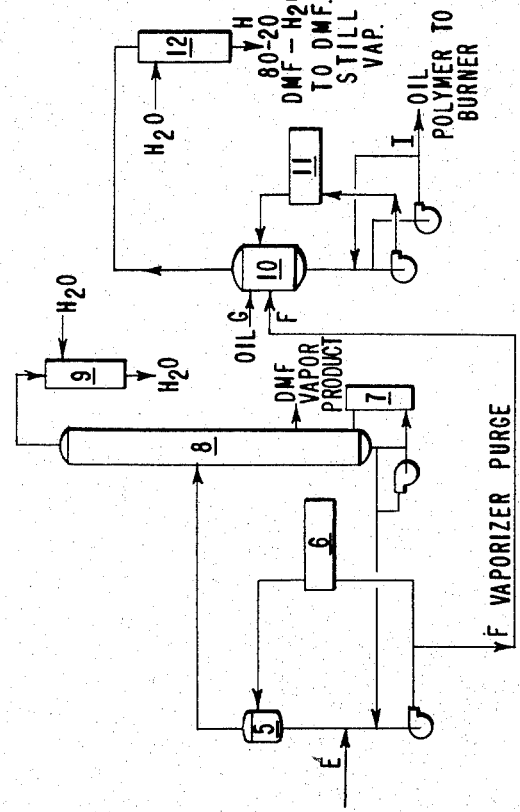
INVENTOR
RONALD LEO HAGEDORN
BY *Walter F. Steinbaugh*
ATTORNEY United States Patent Office 3,419,476
Patented Dec. 31, 1968

3,419,476
PROCESS FOR RECOVERING LIQUID CARBOXYLIC ACID AMINE SOLVENT FROM AQUEOUS SOLUTION THEREOF CONTAINING ACETYLENIC POLYMERS BY FLASH DISTILLATION WITH A HYDROCARBON OIL
Ronald Leo Hagedorn, Louisville, Ky., assignor to E. I. du Pont de Nemours and Company, Wilmington, Del., a corporation of Delaware
Filed Apr. 11, 1967, Ser. No. 630,120
6 Claims. (Cl. 203—52)

ABSTRACT OF THE DISCLOSURE

Process of recovering liquid carboxylic acid amide solvent from an aqueous solution thereof containing acetylenic polymers comprising contacting said aqueous solution with a hot high-boiling hydrocarbon oil to substantially flash distill said solvent and water, recovering said amide, said polymers after said contacting maintaining a single phase in said oil.

BACKGROUND OF THE INVENTION

In the manufacture of monovinylacetylene (MVA) from acetylene using a water miscible amide solvent such as dimethylformamide (DMF) it is desirable to conduct a continuous process with a minimum loss of amide solvent, thus requiring less make up solvent. Typical anhydrous processes are found in U.S. Patents 2,875,258, 3,142,711, and 3,147,312.

The present invention does not pertain to the form of equipment herein discussed. The disclosed apparatus is of a type used in chemical engineering, although applied in this case to specific materials not so treated before. Selection and instrumentation can be carried out by those skilled in the art and operating conditions may be varied in accordance with the composition make up utilizing chemical engineering principles.

The process set forth in the accompanying drawing is representative and illustrates the present invention as it can be practiced by one skilled in the art. Feed compositions, control as to temperature, rate of feeds, etc., all can be varied and controlled routinely as may be required.

In this illustrative drawing, stream F, the DMF still vaporizer purge, is the feed to the DMF still purge recovery system, and typically contains 900–1500 parts DMF, 300–500 parts H₂O, 3–15 parts acetylene polymers, 5–20 parts of low volatile water solubles, and 0–1 trisodium phosphate.

The DMF still purge recovery unit as shown on the drawing consists of a forced circulation vaporizer system. The DMF purge gas-liquid separator 10 to which is fed the said DMF still vaporizer purge stream and high boiling aromatic hydrocarbon illustrates the point of invention to which the present invention is directed as described and claimed in the present specification. The said high boiling aromatic hydrocarbon is maintained at a temperature of 150–160° C. and a pressure of about 130 mm. Hg causing the majority of DMF and water present in the said purge stream to flash off thus maintaining the polymer residue in solution. The said hydrocarbon acts as a solvent for the polymer residue and lessens the formation of solids deposition on heat exchanger tubes thus minimizing tube fouling and facilitates disposal of the polymer. The hydrocarbon also acts as a solvent for any non-polymeric non-volatile materials which may be present in the feed stream. The boiling point of the hydrocarbon oil is sufficiently higher than that of DMF so that a minimum of said hydrocarbon is flashed off with the DMF. The said purge stream is fed directly to the gas-liquid separator (flash tank) containing said hydrocarbon, the hydrocarbon addition being adjusted to control polymer concentration. The resulting DMF feed stream/hydrocarbon composition in the circulation loop of the DMF purge recovery unit is in single phase as the majority of the DMF and water has been flashed off in the gas-liquid separator. 11 is DMF purge reboiler which supplies the heat of vaporization of DMF and water that is flashed in 10. The liquid tube velocity in 11 is maintained at 12–20 ft./sec. The flashed material is condensed in 12, DMF purge recovery condenser. The run-off from the condenser H is fed to the DMF still vaporizer loop for dehydration of the DMF in 8. G represents the hydrocarbon feed to the gas-liquid separator and typically is 100–200 parts. The hydrocarbon-polymer waste stream I typically contains about 100–200 parts hydrocarbon, 3–15 parts acetylene polymers, 5–20 parts of low volatile water solubles, 0–1 parts trisodium phosphate, and 2–5 parts DMF.

The aromatic hydrocarbon utilized in this DMF purge recovery unit is a high boiling aromatic hydrocarbon containing a minimum aromatic weight percent of 60, a maximum volatility of one weight percent as determined by ASTM method D–972, and a minimum initial boiling point of about 350° C. The use of this particular class of hydrocarbons facilitates optimal amide recovery (95+%) and minimizes undesirable hydrocarbon recycle. As heretofore mentioned, the aromatic hydrocarbon maintains the polymer residue in solution and lessens the formation of solids deposition on heat exchanger tubes thus minimizing tube fouling and facilitates disposal of the polymer. Representative commercially available aromatic hydrocarbons which may be used include those available from Shell Oil Company under the name Shell "Dutrex" oils, as more fully characterized in Shell Technical Bulletin SP–64–1, dated April 1964. The aromatic hydrocarbons utilized in the practice of the present invention significantly forms and maintains a single phase with the acetylenic polymers separated from the amide water feed stream as heretofore stated. The high aromaticity of the order of 60 weight percent is indicative of the solvent power of the hydrocarbon.

The amide solvent utilized is preferably dimethyl formamide (DMF); however, it is to be understood that the equivalent amides of the prior art, as set forth in U.S. Patent 2,934,575 may also be recovered and utilized in the practice of the present invention. Specifically encompassed are other amide types of acetylenic solvents which boil above divinylacetylene (DVA) such as N-methyl pyrrolidone and dimethyl acetamide. Specific liquid carboxylic acid amide solvents which can be recovered in the practice of the invention process are those containing not more than 6 carbon atoms.

A representative example further illustrating the present invention follows.

Example

Reference is made to the DMF still purge recovery unit of the accompanying drawing. The following data were obtained from full scale operation as heretofore described in the drawing flow sheet operation analysis:

Stream G _____ 188 parts.
Stream F _____ 843 parts DMF, 282 parts H₂O, 6.1 parts acetylenic polymer.
Stream I _____ 188 parts hydrocarbon, 6.0 parts acetylenic polymer, 3.75 parts DMF.
Liquid circulation temp__ 150–155° C.
System pressure _____ 125–130 mm. Hg absolute pressure.
Percent DMF recovery__ 99.55%.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. The process of recovering a liquid carboxylic acid amide solvent containing not more than 6 carbon atoms from an aqueous solution thereof containing acetylenic polymers dissolved therein comprising contacting said aqueous solution with a high-boiling hydrocarbon oil containing a minimum aromatic content of about 60 weight percent, a minimum initial boiling point of 350° C. and a maximum volatility of one weight percent, said oil being maintained at a temperature sufficient to substantially flash distill off all of said amide solvent and water, recovering said amide, said acetylenic polymers continuously maintaining, after said contacting, a single phase in said aromatic oil.

2. The process of claim 1 wherein said amide is dimethylformamide.

3. The process of claim 1 wherein said aromatic oil is maintained at a temperature between about 150° C. and 160° C. and an absolute pressure of about 130 mm. Hg.

4. The process of recovering a liquid carboxylic acid amide solvent containing not more than 6 carbon atoms from an aqueous solution thereof containing acetylenic polymers dissolved therein, said solvent resulting from the manufacture of monovinylacetylene from acetylene utilizing an amide solvent refining system, comprising contacting said aqueous solution with a high-boiling hydrocarbon oil containing a minimum aromatic content of about 60 weight percent, a minimum initial boilng point of 350° C. and a maximum volatility of one weight percent, said oil being maintained at a temperature sufficient to substantially flash distill off all of said amide solvent and water, recovering said amide, said acetylenic polymers continuously maintaining, after said contacting, a single phase in said aromatic oil.

5. The process of claim 4 wherein said amide is dimethylformamide.

6. The process of claim 4 wherein said aromatic oil is maintained at a temperature between about 150° C. and 160° C. and an absolute pressure of about 130 mm. Hg.

References Cited

UNITED STATES PATENTS

| | | | |
|---|---|---|---|
| 2,500,596 | 4/1950 | Adelson et al. | 203—52 |
| 2,829,088 | 4/1958 | Pirot | 260—561 |
| 2,857,435 | 10/1958 | Gonzalez | 260—678 |
| 2,884,359 | 4/1959 | Bloom et al. | 203—52 |
| 3,093,696 | 6/1963 | Sennewald et al. | 260—678 |
| 3,311,545 | 3/1967 | Rasmussen | 203—52 |

WILBUR L. BASCOMB, JR., *Primary Examiner.*

U.S. Cl. X.R.

203—14, 69, 78, 88, 91; 260—561, 678